No. 675,750. Patented June 4, 1901.
J. W. MORGAN.
MACHINE FOR MAKING MATTRESSES.
(Application filed Apr. 30, 1900.)
(No Model.) 5 Sheets—Sheet 1.
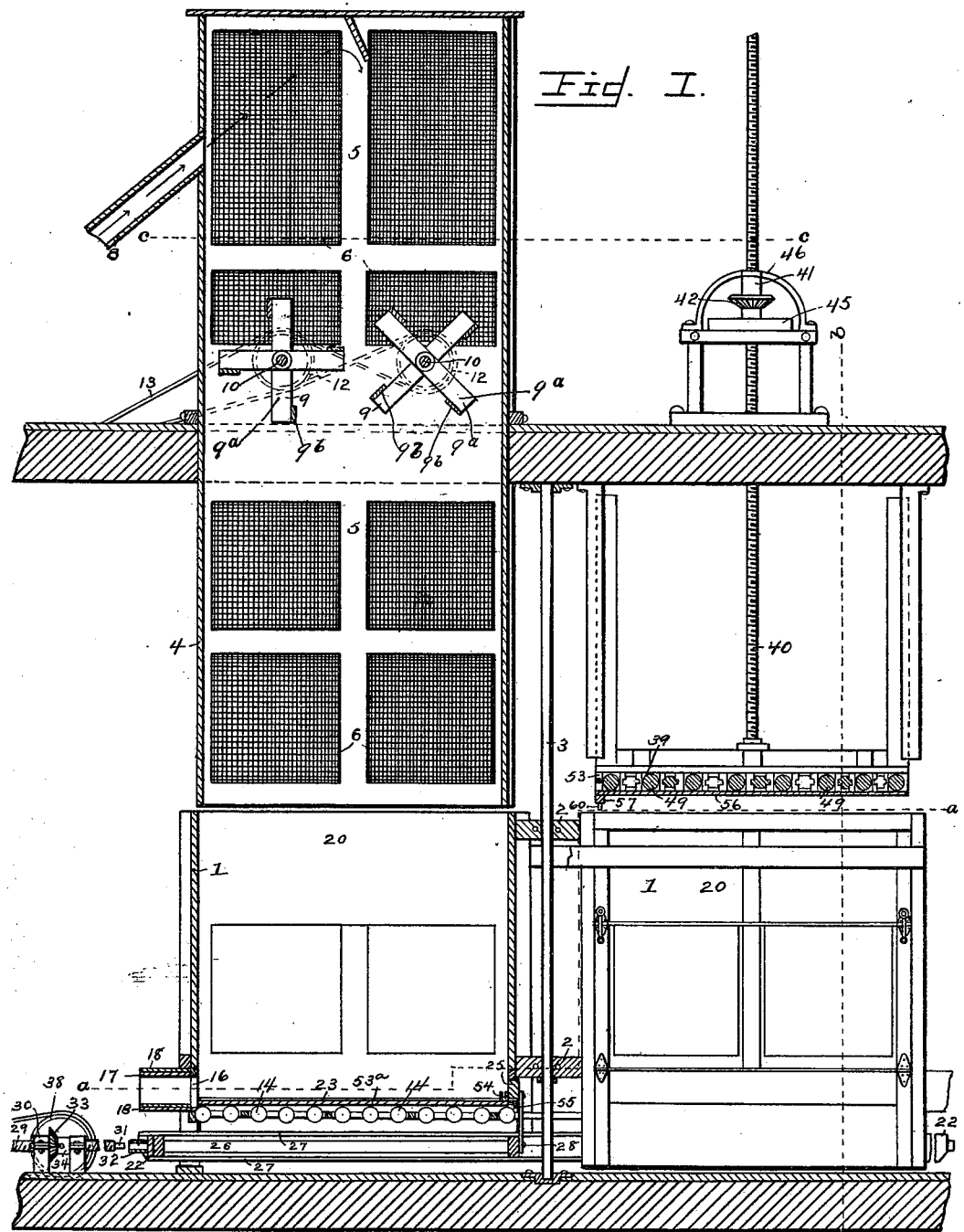
Fig. I.
Witnesses
F. G. Campbell
J. W. Garner
John W. Morgan, Inventor
By his Attorneys,
C. A. Snow & Co.

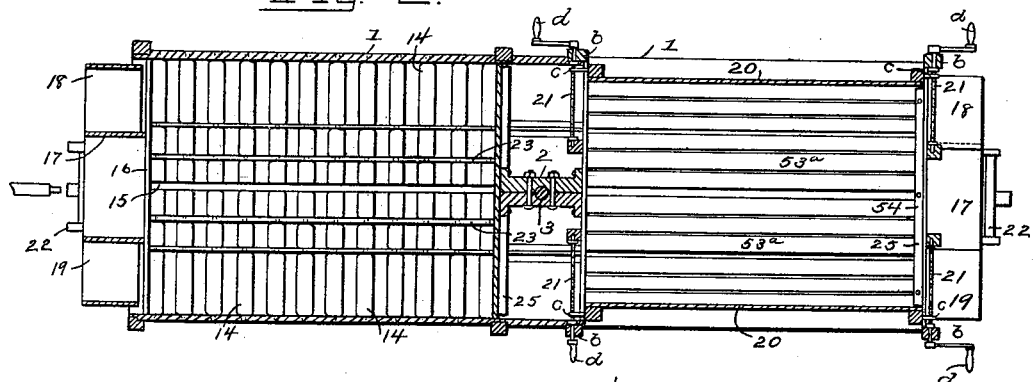

No. 675,750. Patented June 4, 1901.
J. W. MORGAN.
MACHINE FOR MAKING MATTRESSES.
(Application filed Apr. 30, 1900.)
(No Model.) 5 Sheets—Sheet 3.
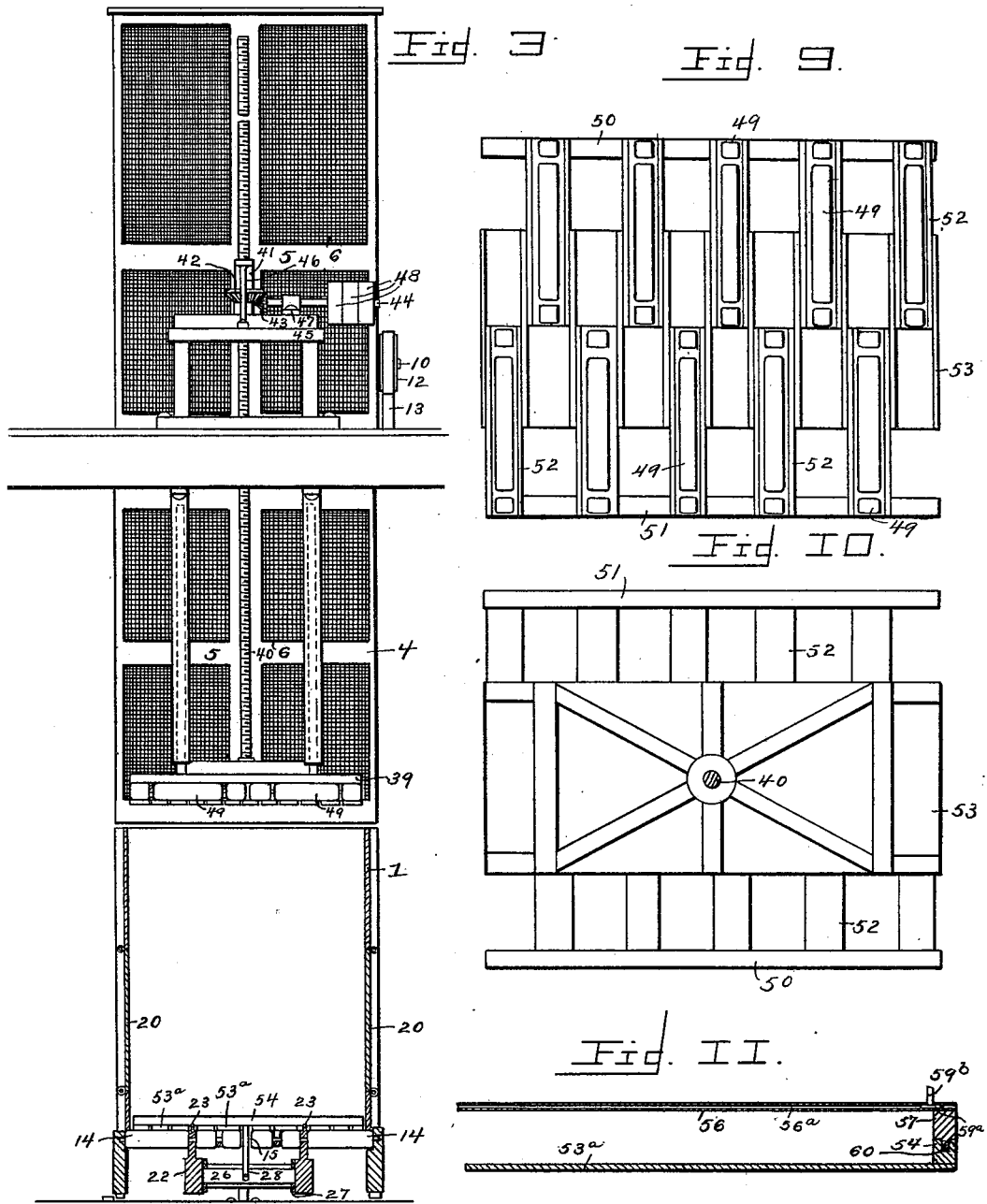
Witnesses
F. G. Campbell
J. W. Garner
John W. Morgan Inventor
By his Attorneys,
C. A. Snow & Co.

No. 675,750. Patented June 4, 1901.
J. W. MORGAN.
MACHINE FOR MAKING MATTRESSES.
(Application filed Apr. 30, 1900.)
(No Model.) 5 Sheets—Sheet 4.
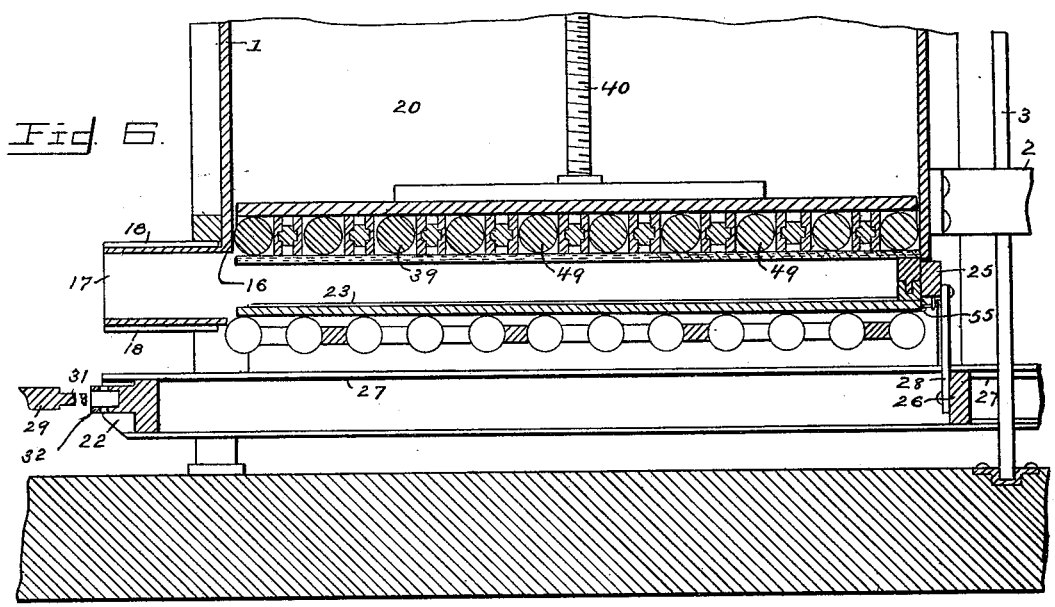
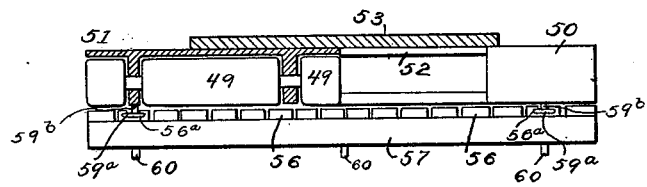
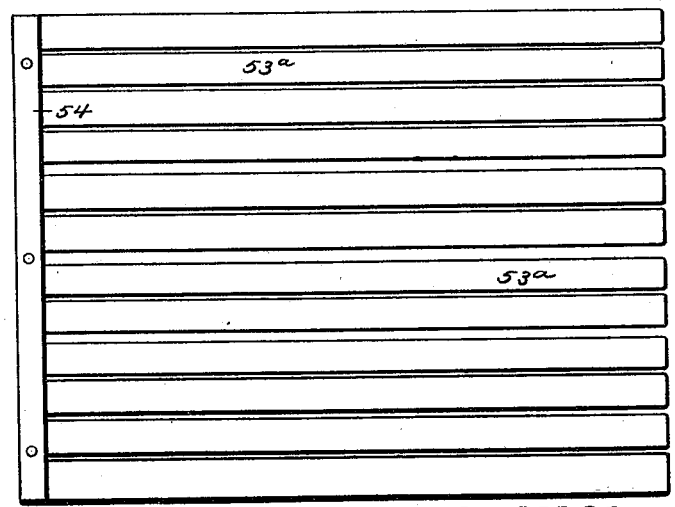
Witnesses
F. G. Campbell
J. W. Garner
John W. Morgan Inventor
By C. A. Snow & Co.
Attorneys

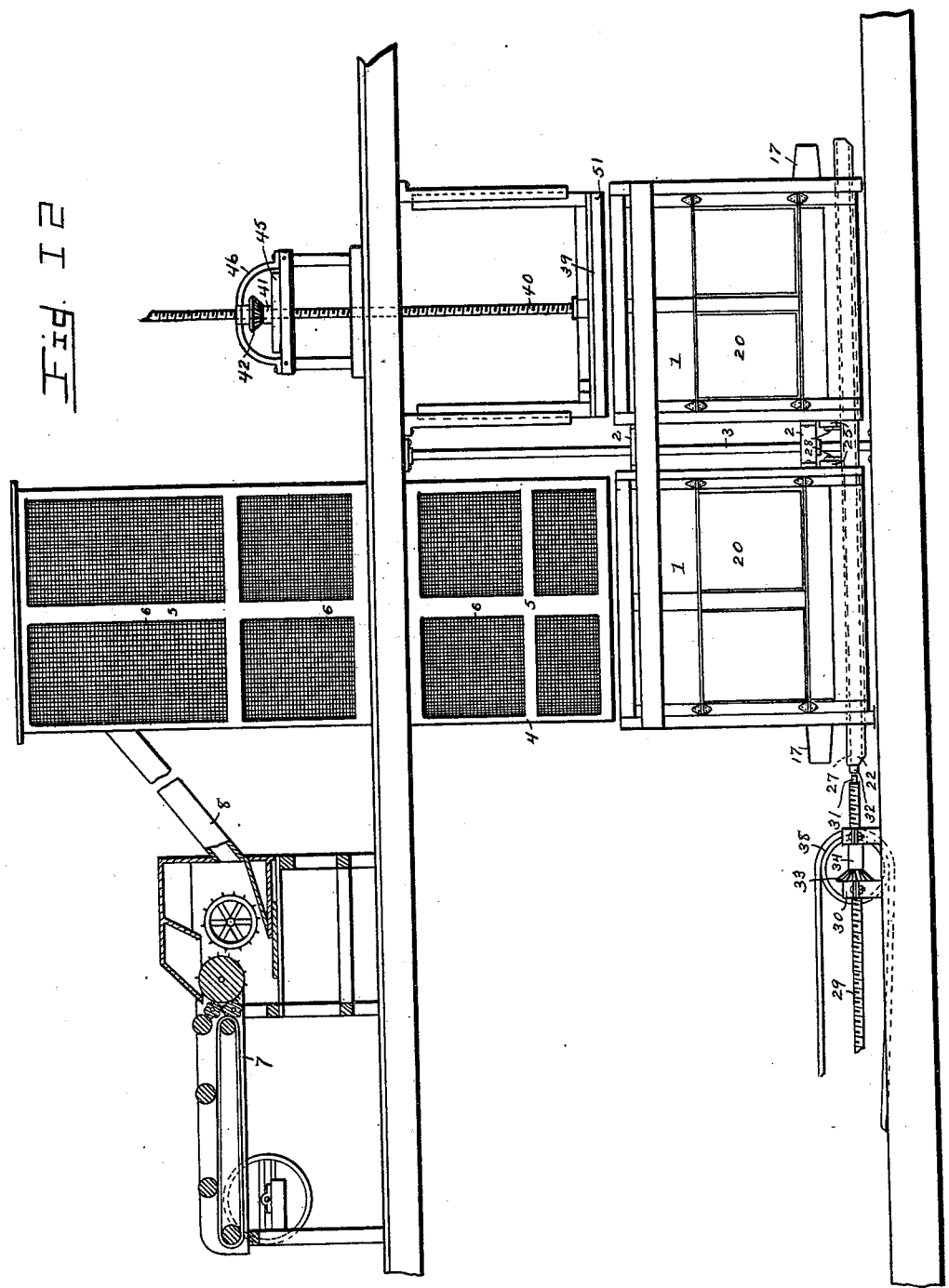

UNITED STATES PATENT OFFICE.

JOHN W. MORGAN, OF SAN ANTONIO, TEXAS, ASSIGNOR, BY MESNE ASSIGNMENTS, TO THE TENNESSEE FELT MANUFACTURING COMPANY, OF WEST NASHVILLE, TENNESSEE.

MACHINE FOR MAKING MATTRESSES.

SPECIFICATION forming part of Letters Patent No. 675,750, dated June 4, 1901.

Application filed April 30, 1900. Serial No. 14,937. (No model.)

*To all whom it may concern:*

Be it known that I, JOHN W. MORGAN, a citizen of the United States, residing at San Antonio, in the county of Bexar and State of Texas, have invented a new and useful Machine for Making Mattresses, of which the following is a specification.

My invention is an improved machine for making cotton mattresses, one object of my invention being to provide a machine which is efficient in compressing lint-cotton into a felt or bat of the required form, size, and density of the mattresses and ejecting the compressed bat or felt while the same is under compression from the press-box and inserting the same into a tick.

A further object of my invention is to provide means for evenly supplying the lint-cotton to the press-box and distributing the same in like quantities over all portions of the bottom of the press-box.

A further object of my invention is to provide means for stiffening the bat or felt while the same is being ejected from the press-box and inserted in the tick.

My invention consists in the peculiar construction and combination of devices hereinafter fully set forth, and pointed out in the claims.

In the accompanying drawings, Figure 1 is a side elevation, partly in section, of a mattress-making machine embodying my improvements. Fig. 2 is partly a top plan view thereof and partly a horizontal sectional view on the line *a a* of Fig. 1. Fig. 3 is a vertical transverse sectional view of the same, taken on line *b b* of Fig. 1. Fig. 4 is a horizontal sectional view of the same, taken on the line *c c* of Fig. 1. Fig. 5 is a horizontal sectional view of the bottom frame common to both of the press-boxes. Fig. 6 is a detail vertical sectional view of the lower portion of one of the press-boxes, showing the follower in the lowermost position therein when the bat is completed. Fig. 7 is a detail transverse sectional view of the follower and the upper series of slats attached thereto. Fig. 8 is a top plan view of the lower series of slats. Fig. 9 is an inverted or bottom plan view of the follower. Fig. 10 is a top plan view of the same. Fig. 11 is a detail view of the upper and lower slats. Fig. 12 is an elevation, partly in section, of the entire machine in operative position.

A pair of press-boxes 1 of suitable size and form are connected together at their ends, as at 2, and supported by a vertically-mounted shaft or rod 3, forming the axis on which the said press-boxes are adapted to rotate and to be brought successively under a distributer and feeder box 4. The latter is usually supported on a floor of a building one story above that in which the press-boxes are located, such arrangement being indicated in the drawings herein; but it will be understood that any suitable supporting-framework may be provided for the machine, and I do not therefore limit myself in this particular.

I will first describe the means whereby the lint-cotton which constitutes the material used in my improved machine for the making of mattresses is supplied to the press-boxes and evenly distributed in the same, so that the mattresses are of like density at all parts.

The distributer and feed box 4 is provided in its sides with panels 5, in which are fitted wire-nettings, as 6, or any suitable foraminous material may be used in the said panels which is adapted to admit of the escape of air from the distributer and feed box without permitting of the escape of the lint-cotton therefrom. A suitable machine (indicated at 7) is employed for straightening the fibers of the cotton in such manner as to cause the same to retain its elasticity when compressed into a mattress bat or felt, and the said fibers of the cotton after being so treated are fed to the distributer and feed box 4 through a pneumatic flue 8. The machine for thus treating the cotton prior to the introduction of the same to the distributer and feed box is fully described, shown, and claimed in my pending application for Letters Patent of the United States, Serial No. 678,892, filed April 26, 1898, and is therefore not more fully described and shown in this specification.

A pair or more of revoluble fans 9 are arranged transversely in the feed and distributer box 4 and supported on shafts 10, which are journaled in the sides of said feed and distributer box, as at 11, and are rotated in opposite directions by means of pulleys 12 and belts 13, as indicated in Fig. 1. The said fans may, however, be rotated by any other suitable means, and I do not limit myself in this particular. In the form of my invention here shown each of the fans 9 comprises a pair of heads or spiders 9ª and a series of bars or wings 9ᵇ, which connect them together. As the lint-cotton is pneumatically conveyed to the upper portion of the feed and distributer box the air passes out of said box through the wire-netting in the panels in the sides thereof and the lint-cotton descends by gravity. It will be observed that the bars or wings 9ᵇ, which are the elements that move by the rotation of the shaft 10 across the distributer-box and in the path of the lint-cotton which descends by gravity from the distributer-box to the press-box, are spaced apart, so that the fans are of open construction, and the descending lint-cotton passes between the said moving elements, which, moving at an angle to the path of the descending lint-cotton, serve to waft the same and so distribute it as to cause the lint-cotton to settle evenly upon all portions of the bottom of the press-box, so that the mattresses formed from the cotton are of uniform density at all points.

It will be understood that modifications may be made in the construction of the distributer-beaters and the means for operating the same without departing from the spirit of my invention as expressed in claim 1, hereunto appended, and I do not limit myself in this particular.

In the bottom of each press-box are located series of antifriction-rollers 14, the same being disposed either as here shown or in any other suitable manner, a longitudinal slot or opening 15 being formed centrally in the bottom of the press-box and the said antifriction-rollers extending from opposite sides of said slot to the sides of the press-box. The press-box is provided at one end with an opening 16, through which the cotton bat or felt may be ejected after the same has been compressed, and on the outer side of said opening is a tick-holder 17, the same comprising a series of telescoping sections 18 19, whereby said tick-holder may be widened or narrowed, as may be required to adapt the same to the width of the mattresses in process of manufacture. The sides 20 of the press-boxes are also adjustable laterally over the bottoms of the press-boxes in any suitable manner in order to vary the width of the press-boxes as may be required to adapt them for the manufacture of mattresses of various widths. I have herein shown adjusting-screws 21 for adjusting the sides of press-boxes, which screws are journaled in suitable bearings $b$ and engage threaded openings in brackets $c$, forming traveling nuts, and which are secured to and project from the ends of the adjustable sides 20. The screws may be turned in either direction by means of crank-handles $d$, with which they are provided. Other means than said adjusting-screws may be employed to effect the adjustment of the sides of the press-boxes, and I do not limit myself in this particular. A longitudinal frame 22 extends under the bottoms of both of the press-boxes and supports longitudinal tracks or ways 23, the upper sides of which are slightly above the upper sides of the antifriction-rollers 14, which form the bottoms of the press-boxes. Said frame 22 forms a portion of the supporting-framework of the press-boxes, and the ends of said longitudinal frame 22 project beyond the outer end of the press-boxes, as shown.

Ejector-heads 25 are carried at the inner ends of slide-frames 26, which are horizontally disposed within the sides of the frame 22 and guided and supported therein between trackways 27 on the inner sides of said frame 22. The said ejector-heads are disposed transversely in the bottoms of the press-boxes, bear upon and are adapted travel on the trackways 23 of the frame 22, and are provided with depending bracket-arms 28, which are bolted or otherwise suitably secured to the cross-bars $e$, which form the inner ends the slide-frames 26. The function of the slide-frames is to communicate motion to the ejector-heads, and it will be understood from the foregoing that by moving the slide-frames 26 longitudinally the ejector-heads will be caused to move longitudinally on the bottom of the press-boxes toward or from the ejector-openings 16 and the tick-holders at the outer sides of said openings.

Any suitable means may be employed for thus operating the slide-frames 22 and ejector-heads. In the drawings I show a screw-shaft 29, which is adapted to travel longitudinally in a suitable standard 30 and is provided at its inner end with a coupling member 31, adapted to be connected to the coupling member 32 at the proximate outer end of the slide-frame 22. A beveled gear-wheel 33, fast on a sleeve-nut 34, mounted in the standard 30 and in which the screw-rod 29 travels, is engaged by a beveled pinion 35 on a shaft 36, which is mounted in suitable bearings 37 and provided with fast and loose pulleys, (indicated at 38,) whereby said shaft 36 is adapted to be driven by a power-belt to impart motion to the screw rod or shaft 29 and through the latter and the slide-frame 22, coupled thereto, to the ejector-head carried by said slide-frame in order to move the ejector-head outwardly in the press-box, and thereby eject the bat or felt while under compression between the follower and the bottom of the press-box through the tick-holder and insert the same into a tick, the open end of which is arranged over the tick-holder.

The follower 39 is operated by a vertically-disposed screw-shaft 40. A tubular nut or sleeve 41 engages the threaded screw-rod 40 and is provided with a beveled gear-wheel 42, which engages a beveled pinion 43 on a power-shaft 44, whereby the follower may be raised and lowered, as will be understood. A suitable supporting-frame 45 is provided which has suitable bearings 46 47 for the sleeve or nut 41 and the power-shaft 44. As herein shown, said power-shaft is provided with fast and loose pulleys 48, whereby it may be operated by a power-belt in the usual manner. Any suitable means may be employed for operating the follower, and I do not limit myself in this particular. The lower side of the follower is provided with series of antifriction-rollers 49, which are similar to the antifriction-rollers with which the bottoms of the press-boxes are provided. The follower comprises the laterally-adjustable sections 50 51, having overlapping transversely-disposed arms 52, that carry the rollers 49, and the central portion 53, to which the said laterally-adjustable sections are secured. Said sections 50 51 are telescopically disposed, and hence the follower is adapted to be widened or narrowed by extending or moving inward the sections 50 51 and may thus be adapted to the width of the press-boxes.

I will now describe means whereby the bats or felts may be stiffened during the process of ejecting them from the press-boxes and inserting them in the ticks.

On the bottom of each press-box is placed a series of slats 53, which are connected together at one end by a cross-bar 54, the latter extending above the upper sides of said slats and corresponding to about half the thickness of the bats or felts. The said series of slats 53 rest upon the antifriction-rollers in the bottom of the press-boxes, and the cross-bars 54 are attached to the ejector-heads by means of hooks, as at 55, or in any other suitable manner, whereby when the said ejector-heads are moved inward or outward in the bottoms of the press-boxes the said series of slats 53 are moved with said ejector-heads. A series of slats 56, which are similar to the slats 53, are connected together at their inner ends by a cross-bar 57, which is similar to the cross-bar 54. The said series of slats 56 are secured under the follower and prevented from dropping therefrom when the same is raised by any suitable means. Keepers 59 are here shown to thus secure the said slats to the lower side of the said follower, while permitting the said slats to move endwise under the follower. Said keepers are circular disks 59$^a$, secured on studs or pins 59$^b$, and the sides of which form flanges that engage grooves 56$^a$, with which certain of the slats 56 are provided. It will be understood that when the follower and the press-boxes have been adjusted to the required width a series of slats 56 of the required width will be used in connection therewith.

It will be understood that the series of slats in the bottoms of the press-boxes are disposed under the bats or felts and that the series of slats carried by the follower are disposed over the bats or felts as the latter are compressed, and it will be further understood from the foregoing description and by reference to the drawings that when the follower descends in a press-box to compress a bat or felt therein the cross-bar which forms the connecting-head of the series of slats carried by the follower will be disposed in front of the ejector-head in the bottom of the press-box, and hence when said ejector-head is moved outward in order to eject the bat or felt from the press-box through the opening 16 and the tick-holder and insert the same into the tick said upper and lower series of slats will be forced with the bat or felt into the tick, thus serving to stiffen the bat and rigidly sustain the same while it is being inserted in the tick. Any suitable means may be employed for securing the upper series of slats to the ejector-heads, so that when the latter are run inward over the bottom of the press-box after the bat has been ejected therefrom said upper series of slats will move with the same, together with the lower series of slats, and be withdrawn from between the tick and the bat and restored to their initial position. As here shown, I have provided a series of dowel-pins 60, which may be attached permanently to the cross-bar either of the lower series of slats or of the upper series of slats, which dowel-pins when said series of slats approach each other on the compression of a bat or felt enter openings in the opposing cross-bar, and thus secure the said cross-bars, and hence the said upper and lower series of slats, together, so that the same move simultaneously inward with the ejector-head on the bottom of the press-box in the manner and for the purpose hereinbefore described.

The operation of my improved mattress-making machine will be readily understood from the foregoing specification. The press-boxes are swung pivotally so that each registers alternately with the follower and the distributer-box. Hence one press-box is supplied with material while the follower compresses the material previously fed into the other into a bat, which bat is ejected into a tick by the means and in the manner hereinbefore fully described. The slats carried by the bottoms of the press-boxes and by the follower bear against the antifriction-rollers 14 49, which serve to minimize the friction as the slats are moved lengthwise, together with the compressed bat, by the ejector to force the bat into a tick.

Having thus described my invention, I claim—

1. In a mattress-making machine, the combination of a press-box, a distributer-box directly above the press-box, a distributer-beater in the distributer-box, and means to feed lint-cotton into the distributer-box at a point above the distributer-beater, the latter being directly in the path of the lint-cotton which descends by gravity through the distributer-box to the press-box, and said distributer-beater having moving elements between which the lint-cotton passes in its descent, said distributer-beater serving to distribute the cotton evenly on the bottom of the press-box, substantially as described.

2. In a mattress-making machine, the combination of a distributer-box having screened openings for the exit of air, means for feeding lint-cotton to said distributer-box, a plurality of beaters in the distributer-box below the line of feed of lint-cotton thereto and arranged side by side, and a shiftable press-box adapted for adjustment in line with the distributer-box, substantially as described.

3. In a mattress-making machine, the combination of a distributer-box having openings for the escape of air, means for pneumatically feeding lint-cotton to said distributer-box, beaters mounted in the distributer-box for rotation in opposite directions and arranged to act on the lint-cotton to distribute the same uniformly throughout the area of the distributing-box, and a press-box adapted to be alined with the distributing-box, substantially as described.

4. In a machine for making mattresses, a press-box having laterally-adjustable sides, and a follower composed of laterally-adjustable sections, each section having a series of supporting-arms, the arms of said respective sections adapted to interlock with each other and permit said sections to be drawn toward or from the center of the follower, substantially as described.

In testimony that I claim the foregoing as my own I have hereto affixed my signature in the presence of two witnesses.

JOHN W. MORGAN.

Witnesses:
   GEO. T. FINEGAN,
   JOHN A. CAFFEY.